United States Patent
Bracken

[11] 3,960,418
[45] June 1, 1976

[54] CANTILEVER MOUNTING
[75] Inventor: Joseph W. Bracken, Redford Township, Mich.
[73] Assignee: Eaton Corporation, Cleveland, Ohio
[22] Filed: Nov. 7, 1974
[21] Appl. No.: 521,717

[52] U.S. Cl. .......................... 308/184 R; 60/39.36
[51] Int. Cl.² ........................................ F16C 35/04
[58] Field of Search .................... 308/184 R, 26; 60/39.36; 230/116

[56] References Cited
UNITED STATES PATENTS

| | | | |
|---|---|---|---|
| 2,698,772 | 1/1955 | Roberts | 308/184 R |
| 2,757,988 | 8/1956 | Lecourbe | 308/184 R |
| 3,005,668 | 10/1961 | Szydlowski | 308/184 R |
| 3,053,590 | 9/1962 | Dison, Jr. | 308/184 R |
| 3,205,024 | 9/1965 | Morley et al. | 308/184 R |
| 3,743,365 | 7/1973 | Kato | 308/184 R |

Primary Examiner—Robert R. Song
Assistant Examiner—Richard A. Bertsch
Attorney, Agent, or Firm—Teagno & Toddy

[57] ABSTRACT

An annular cylindrical cantilever mounting having a fixed end portion secured to a housing, a free end portion supporting a bearing, and a resilient cage portion with ribs interconnecting the fixed and free end portions and diverging in cross section from their midpoint to the end portions. The bearing journals a rotary shaft. The ribs provide resilient radial movement of the bearing to change the normal critical frequencies of the rotating shaft and remove them from the shaft's operating range.

10 Claims, 4 Drawing Figures

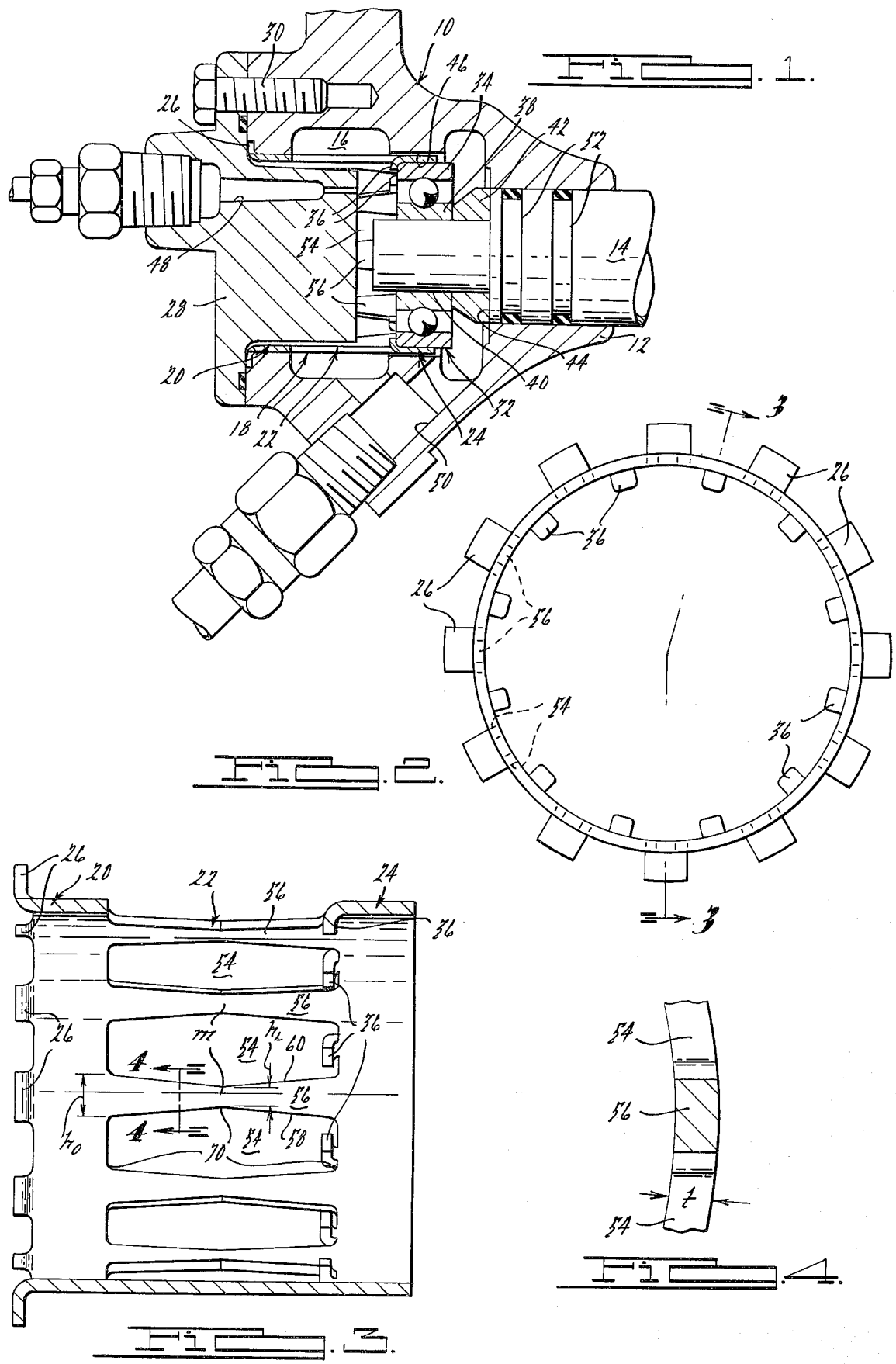

CANTILEVER MOUNTING

BACKGROUND OF THE INVENTION

1. Field of the Invention

This invention relates generally to a mounting for supporting an antifriction bearing journalling a rotary shaft, and more particularly to a cantilever mounting for resiliently supporting the bearing for radial movement.

2. Description of the Prior Art

One of the principal sources of vibration in equipment having high speed rotating shafts, such as turbomachinery, is unbalance of the shaft. The unbalance can excite one or more critical frequencies of the rotary shaft and induce resonance in the shaft that may be tuned to the shaft's running frequency.

The effects of unbalance may be minimized by resiliently supporting, for radial movement, one or more of the bearings journalling the shaft. Cage type cantilever mountings have found particular utility for resiliently supporting the bearings journalling a shaft assembly of a turbine engine. An explanation of the operation of such cantilever mountings may be found in the Society of Automotive Engineers Paper No. 382B, published 1961, entitled "Gas Turbine Shaft Dynamic," and authored by Glenn Hamburg and Jim Parkinson. Cantilever mountings are also disclosed in U.S. Pat. No. 2,922,278; 3,005,668; 3,205,024; and 3,416,723. In each of the cited disclosures the cantilever mounting is an annular cylindrical member having a fixed and a free end axially spaced by a cage having a plurality of circumferentially spaced, axially extending ribs. The fixed end is secured to a rigid mounting support, such as the housing of a turbine engine, and the free end supports a bearing journalling the shaft of the engine. The ribs allow the bearing to radially move relative to the housing. Whereas the known cantilever mountings have been found to be generally satisfactory for many applications, applicant has determined that they: have relatively high stresses at the junction of the ribs with the ends; are, in some instances, too long to fit in the available space; and are expensive to manufacture.

SUMMARY OF THE INVENTION

It is accordingly an object of the present invention to provide a resilient cantilever mounting that, for a given spring value, provides a minimal stress at the junction of the ribs with the ends during radial deflection.

Another object of the invention is to provide a resilient cantilever mounting that has a minimal axial length for a given spring rate of the ribs.

A further object of the invention is to provide a cantilever mounting that may be simply and inexpensively manufactured.

According to a feature of the invention the circumferentially spaced ribs of the cage portion diverge in one view from a location intermediate their ends toward their ends. This arrangement stresses material that is relatively unstressed in a constant cross sectional rib thereby providing increased deflection for a given length or a shorter length for a given spring rate. The arrangement reduces stresses at the ends of the rib for a given spring rate and length due to the relatively large amount of material in these end areas and the more efficient use of the available material in each rib.

BRIEF DESCRIPTION OF THE DRAWINGS

FIG. 1 is a broken away section taken through part of a gas turbine engine provided with a cantilever mounting according to the invention.

FIG. 2 is an enlarged end view of the cantilever mounting illustrated in FIG. 1.

FIG. 3 is a sectional view taken on line 3—3 of FIG. 2.

FIG. 4 is a sectional view taken on line 4—4 of FIG. 3.

DETAILED DESCRIPTION OF THE DRAWINGS

FIG. 1 illustrates a portion of the shaft assembly of a single shaft gas turbine engine. The remaining portion of the engine is illustrated in greater detail in U.S. patent application Ser. No. 214,703 assigned to the assignee of the present application. Generally, the engine includes a shaft assembly journalled in outboard bearings and having a radial compressor and a radial turbine interconnected by a central member. The illustration of FIG. 1 was chosen solely for the purpose of providing a given environment for the inventive cantilever mounting. It should be appreciated that the inventive cantilever mounting can be used for rotatingly supporting other high speed shaft assemblies. The illustrated shaft assembly, instead of being a portion of a turbine engine, therefore, could just as easily be part of a turbocompressor, high speed motor, or high speed pump.

Referring now in detail to FIG. 1, the engine generally includes an annular bearing housing 10 having an end 12 sealingly passing a shaft 14. Seated concentrically within a cavity 16 within bearing housing 10 is an integral cantilever mounting 18 which includes an annular fixed end portion 20, an annular axially extending cylindrical cage portion 22 having one end engaged with fixed end portion 20, and an annular free end portion 24 engaged with the other end of cage portion 22.

Fixed end 20 is rigidly supported by bearing housing 10 and includes a plurality of radially extending tabs 26 which are clamped between bearing housing 10 and an end plate 28. End plate 28 is secured to bearing housing 10 by a plurality of bolts 30, only one shown, and seals the open end of cavity 16.

Free end 24 supports a ball bearing 32. The periphery of the outer race 34 of ball bearing 32 is engaged with free end 24 for movement therewith. A plurality of tabs 36 extending radially from free end 24 contact one side of outer race 34. The inner race 38 of ball bearing 32 is pressed onto a stepped down portion 40 of shaft 14. A bearing spacer 42 contacts inner race 38 on the other side of ball bearing 32 and also contacts a shoulder 44 on shaft 14. It is desirable to maintain a small clearance between the outer periphery of free end 24 and an annular surface 46 on bearing housing 10. The clearance allows for limited radial movement of free end 24 while preventing excessive radial movement.

Ball bearing 32 is lubricated by introducing oil through a passage 48 in end plate 28. The oil enters cavity 16 and exits via a passage 50 in the lower portion of bearing housing 10. Appropriate connectors are provided along with an oil supply system. Seals 52 prevent oil from flowing out of cavity 16 between shaft 14 and bearing housing 10 while still permitting shaft 14 to move radially relative to bearing housing 10.

Referring in detail to the inventive cantilever mounting 18, the cage portion 22 includes a plurality of axially extending slots 54 delimited at their ends by fixed and free ends portions 20 and 24 and at their sides by axially extending ribs 56. Ribs 56 serve to provide the resilient radial support for ball bearing 32. Each rib 56 has a constant thickness $t$ in one view (FIG. 4) and diverges outwardly from its midpoint $m$ in another view (FIG. 3) into fixed and free end portions 20 and 24. Sides 58 and 60 joined to each midpoint $m$ and to fixed and free ends 20 and 24 may be straight as illustrated or another configuration, such as parabolic. Standard equations for cantilever beams may be used to calculate the stresses and length of each rib. In the disclosed embodiment stamping techniques govern the thickness and size of the midpoint for each rib. If desired the maximum stress can be moved toward the midpoint $m$ from the junction of the ribs with the end portions by properly designing the ribs. This may be achieved by maintaining K in the range of $\frac{1}{2}<K<1$ where K is equal to $(h_o - h_L)/h_o$.

In determining the number of ribs 56 on cantilever mounting 18, the spring rate of each rib is calculated and then divided into the desired spring rate for the cantilever mounting. The quotient is then rounded to a whole number which represents the number of ribs. The ribs are equally circumferentially spaced around cage portion 22. If the number of ribs 56 is too great, the ribs can be redesigned to have a greater spring rate to thereby reduce their total number.

In the illustrated embodiment, cantilever mounting 18 is formed from tubular metal stock having thickness $t$. Ribs 56 are stamped out of cage portion 22 and the tabs 26 and 36 are also stamped out of the tubular stock and appropriately bent. The process is known in the roller bearing art.

It can readily be seen that applicant has provided a design for cantilever mounting that may be inexpensively manufactured with known mass production technology. Further, the cantilever mounting can be manufactured from a single piece of material. As a result of the divergence of ribs 56 from midpoint $m$ to end portions 20 and 24 the axial length of cage portion 22 can be shortened for a given spring rate and the maximum stresses on the ribs can be reduced.

It should be appreciated that a preferred embodiment of the invention has been disclosed. The divergent rib concept can also be used advantageously with other cantilever bearing mountings. For example, the ribs could be circular, or another configuration, along any plane perpendicular to the axis of the cantilever mounting and diverge from the midpoint thereof to the area of joining with the end portions. The ribs could also be made separately and attached to the end portions.

What is claimed is:

1. In a device having: a housing; an axially extending shaft, bearings journalling the shaft for rotation; and a cantilever mounting having a fixed end portion connected to the housing, a free end portion axially spaced from the fixed end and supporting one of the bearings, and an annular cage portion having a plurality of circumferentially spaced axially extending ribs connected at their opposite ends respectively to the fixed and free end portions and delimiting therebetween a plurality of slots, the ribs being operative to change the normal critial frequencies of the shaft and remove them from the normal operating range of the shaft: the improvement wherein, in at least one longitudinal section, the opposite longitudinal edges of the ribs diverge from a location intermediate the fixed and free end portions toward the fixed and free end portions.

2. The improvement according to claim 1 wherein the ribs are integral with the fixed and free ends.

3. The improvement according to claim 1 wherein the cross section of each rib is quadrilateral in any plane perpendicular to the axis of the cage portion.

4. The improvement according to claim 1 wherein the ribs have a substantially constant radial thickness along their entire length.

5. In a generally cylindrical cantilever mounting having a first annular end portion adapted to be fixedly supported, a second annular end portion adapted to support a bearing, and an annular cage portion having a plurality of circumferentially spaced, resilient ribs respectively connected at their opposite ends to the end portions and delimiting therebetween a plurality of slots, the ribs being operative to move radially to provide for radial movement of the end portions relative to one another and having a predetermined spring rate; the improvement wherein each of the ribs increase in cross-sectional area in opposite directions from a location intermediate the end portions to locations adjacent the respective end portions.

6. The improvement according to claim 5 wherein each rib increases in cross-sectional area to the areas of connection of the rib to the end portions.

7. The improvement according to claim 5 wherein the cross section of each rib is quadrilateral along any plane perpendicular to the axis of the cage portion.

8. The improvement according to claim 5 wherein the ribs have a substantially constant radial thickness along their entire length.

9. The improvement according to claim 5 wherein the ribs are integral with the first and second end portions.

10. A generally cylindrical cantilever mounting for resiliently supporting a bearing relative to a housing comprising:
  A. a first annular end portion;
  B. means on the first end portion for fixedly mounting the first end portion relative to the housing;
  C. a second annular end portion;
  D. means on the second end portion for retaining the bearing for movement with the second end portion; and
  E. an annular cage portion including a plurality of circumferentially spaced, resilient ribs integral with the end portions and respectively connected at their opposite ends to the end portions and delimiting therebetween a plurality of slots, each rib having a configuration which increases in cross-sectional area in opposite directions from a location intermediate the end portions to their areas of connection with the respective end portions.

* * * * *